United States Patent [19]
Kalkunte

[11] Patent Number: 5,963,560
[45] Date of Patent: Oct. 5, 1999

[54] METHOD AND ARRANGEMENT FOR PROVIDING MULTI-LEVEL PRIORITY IN A ROTATING PRIORITY ARRANGEMENT FOR ACCESS TO MEDIUM IN AN ETHERNET NETWORK

[75] Inventor: Mohan V. Kalkunte, Sunnyvale, Calif.

[73] Assignee: Advanced Micro Devices, Inc., Sunnyvale, Calif.

[21] Appl. No.: 08/811,485

[22] Filed: Mar. 5, 1997

[51] Int. Cl.⁶ ................................................. H04L 12/413
[52] U.S. Cl. ............................................................. 370/448
[58] Field of Search .................................... 370/445, 446, 370/447, 448, 462, 910; 340/825.05, 825.51

[56] References Cited

U.S. PATENT DOCUMENTS

| | | | |
|---|---|---|---|
| 5,319,641 | 6/1994 | Fridrich et al. | 370/447 |
| 5,353,287 | 10/1994 | Kuddes et al. | 370/448 |
| 5,404,353 | 4/1995 | Ben-Michael et al. | 370/235 |
| 5,418,784 | 5/1995 | Ramakrishnan et al. | 370/445 |
| 5,422,887 | 6/1995 | Diepstraten et al. | 370/448 |
| 5,436,903 | 7/1995 | Yang et al. | 370/448 |
| 5,453,987 | 9/1995 | Tran | 370/447 |
| 5,526,355 | 6/1996 | Yang et al. | 370/448 |
| 5,642,360 | 6/1997 | Trainin | 370/230 |
| 5,774,658 | 6/1998 | Kalkunte et al. | 395/200.6 |
| 5,784,375 | 7/1998 | Kalkunte et al. | 370/448 |
| 5,812,554 | 9/1998 | Kadambi et al. | 370/473 |
| 5,822,538 | 10/1998 | Krishna et al. | 395/200.65 |

FOREIGN PATENT DOCUMENTS

| | | |
|---|---|---|
| 0632621 | 4/1995 | European Pat. Off. . |

OTHER PUBLICATIONS

Comer, D.E., et al., "A Rate–Cogested Avoidance and Control Scheme for Packet Switched Networks," Proceedings of the International Conference on Distributed Computin Systems, Paris, May 28–Jun. 1, 1990, Conf. 10, May 28, 1990, IEEE, pp. 390–397.

Williamson, C.L., et al., "Loss–Load Curves: Support for Rate–Based Congestion Control in High–Speed Datagram Networks," Proceedings of the Conference on Communications Architectures and Protocols (SIGCOMM), Zurich, Sep. 3–6, 1996, vol. 21, No. 4, Sep. 3, 1991, Association for Computing Machinery, pp. 17–28.

Pouzin, Louis, "Methods, Tools, and Observations on Flow Control in Packet–Switched Data Networks," IEEE Trans. on Communications, vol. 29, No. 4, Apr. 1981, New York, pp. 413–426.

Gerla, M. et al., "Congestion Control in Interconnected LANS," IEEE Network, vol. 2, No. 1, Jan. 2, 1988, New York, pp. 72–76.

AMD, AM79C970 PCnet™–PCI Single–Chip Ethernet Controller for PCI Local Bus, Jun. 1994, pp. 1–868 –1–1033.

*Primary Examiner*—Chau Nguyen
*Assistant Examiner*—Soon-Dong Hyun

[57] ABSTRACT

A multi-level rotating priority scheme for access to the medium of a network by network stations is controlled in a decentralized manner. Each network station maintains its own record of the time interval it must wait following the medium becoming available before it will attempt transmission of data. The network stations modify their time intervals based on information they receive about collisions of data that occur on the network. The time intervals in the individual network stations are eventually modified during operation so that each has different time intervals, and effectively, different priority for accessing the medium. Following a transmission by a network station, the time intervals change in the network stations and the priority rotates.

18 Claims, 7 Drawing Sheets

METHOD AND ARRANGEMENT FOR PROVIDING MULTI-LEVEL PRIORITY IN A ROTATING PRIORITY ARRANGEMENT FOR ACCESS TO MEDIUM IN AN ETHERNET NETWORK

FIELD OF THE INVENTION

The present invention relates to network interfacing and more particularly, to methods and systems for efficiently accessing Ethernet media.

DESCRIPTION OF RELATED ART

Local area networks use a network cable or other media to link stations on the network. Each local area network architecture uses a media access control (MAC) enabling network interface cards at each station to share access to the media.

The Ethernet protocol ISO/IEC 8802-3 (ANSI/IEEE Std. 802.3, 1993 edition) defines a half-duplex media access mechanism that permits all stations to access the network channel with equality. Each station includes an Ethernet interface card that uses carrier-sense multiple-access with collision detection (CSMA/CD) to listen for traffic on the media. Transmission by a station begins after a period of time following the sensing of a deassertion of a receive carrier on the media, indicating no network traffic. After starting transmission, a transmitting station will monitor the media to determine if there has been a collision due to another station sending data at the same time. If a collision is detected, both stations stop, wait a random amount of time, and retry transmission.

Any station can attempt to contend for the channel by waiting a predetermined time after the deassertion of the receive carrier on the media, known as the interpacket gap (IPG) interval. If a plurality of stations have data to send on the network, each of the stations will attempt to transmit in response to the sensed deassertion of the receive carrier on the media and after the IPG interval, resulting in a collision.

Ethernet networks mediate collisions by using a truncated binary exponential backoff (TBEB) algorithm, which provides a controlled pseudorandom mechanism to enforce a collision backoff interval before retransmission is attempted. According to the truncated binary exponential backoff algorithm, a station keeps track of the number of transmission attempts (j) during the transmission of a current frame. The station computes a collision backoff interval as a randomized integer multiple of a slot time interval, and attempts retransmission after the collision backoff interval. The station will attempt to transmit under the truncated binary exponential algorithm a maximum of sixteen times.

The collision backoff interval is calculated by selecting a random number of time slots from the range of zero to $2^j-1$. For example, if the number of attempts j=3, then the range of randomly selected time slots is (0,7); if the randomly-selected number of time slots is four, then the collision backoff interval will be equal to four slot time intervals. According to Ethernet protocol, the maximum range of randomly selected time slots is $2^{10}31$ 1.

The truncated binary exponential algorithm has the disadvantage that the range of randomly selected time slots $(0,2^j-1)$ increases exponentially each time a specific station loses a retry attempt after collision, resulting in a higher probability that during the next collision mediation the station will randomly select a larger integer multiple of time slots and lose the next collision mediation. Thus, a new station that has data to transmit has a higher probability of winning a collision mediation than the station having a greater number of attempts. This effect is known as the capture effect, wherein a new station in the collision mediation effectively has a greater probability of capturing access to the media than the losing station until the maximum number of attempts has been reached.

Hence, collision-based networks having collision mediation require each colliding station to back off a random number of slot times, dependent on the number of attempts, before reattempting access to the medium. Such collision mediation reduces the network throughput and creates unbounded packet access latencies. Consequently, applications requiring bounded access latencies such as interactive multimedia cannot be supported on half-duplex networks.

Alternative network architectures have relied upon an external control mechanism that controls access to the shared medium. For example, a token ring network passes a token in a sequential manner to network stations. A station that acquires the token has the right to transmit on the network. Upon completion of the transmission, the token is passed on to the next station. The passing of the token, however, uses up bandwidth on the media. Bandwidth is also wasted if the token is received and then passed by a station that has no data to transmit. Hence, the token ring network limits network throughput because an individual station cannot transmit data until it receives the token, regardless of whether any other station has any data to send.

Another network arrangement specified by IEEE 802.12-1995, "Demand Priority Access Method, Physical Layer and Repeater Specification for 100 Mb/s Operation," also known as the VG ANYLAN network, uses a centralized hub to arbitrate among the requests from network stations. The hub grants access to the stations in a round robin fashion. An advantage of this network is that both low priority and high priority traffic are supported. The use of a priority scheme facilitates the support of applications in networks that require higher priority for transmission, such as real-time delivery of data. In the VG ANYLAN network, if there are high priority requests, the hub first arbitrates among them and then arbitrates among the low priority requests. The hub therefore manages two round robin queues, one for high priority and another for low priority. However, the VG ANYLAN network still requires control by a central hub.

Other proposals have suggested the user of a central management entity to assign a slot number to each station on the network, where a station transmits only when a current slot number is equal to the station slot number. Such proposals also require a centralized management entity to manage the network.

SUMMARY OF THE INVENTION

There is a need for a multi-level rotating priority scheme for access to a medium of a network with a decentralized control of the priority.

This and other needs are met by the present invention which provides in network stations coupled to media of a network, a method of accessing the media. A priority level of a data packet to be transmitted is determined. It is then determined whether there is non-activity on the media. A wait time following the determination of non-activity on the media to transmit the data packet is then determined. This wait time is a function of the priority level of the data packet to be transmitted and a current priority of the network station among the network stations on the network for that data priority level. The data packet is transmitted on the medium after the determined wait time following the determination of non-activity on the media, if there is currently no activity on the media.

The determination of the wait time by the network stations allows the priority control to be decentralized, as the access to the media by the individual network stations is a function of the wait times of the different network stations.

In certain preferred embodiments, the priority of the network stations for a given data level of priority rotates so that each station on the network is given equal access to the media for transmission of data of equal priority.

The foregoing and other features, aspects and advantages of the present invention will become more apparent from the following detailed description of the present invention when taken in conjunction with the accompanying drawings.

BRIEF DESCRIPTION OF THE DRAWINGS

FIGS. 4, 5, 6, 7 and 8 depict portions of a method of controlling access to the medium of the network.

DETAILED DESCRIPTION OF ILLUSTRATIVE EMBODIMENTS

Figure 1:
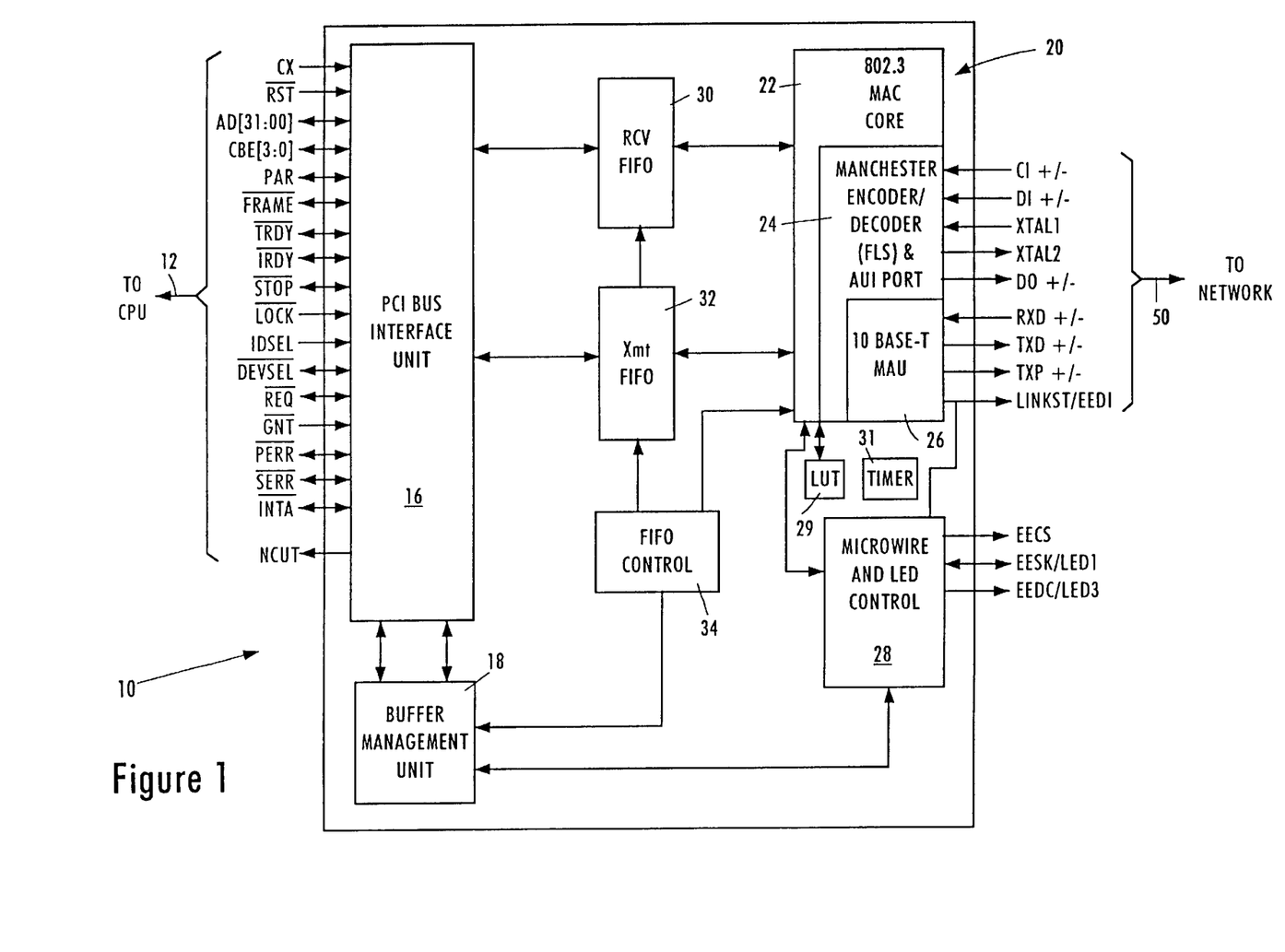
FIG. 1 is a block diagram of a network interface according to an embodiment of the present invention.

FIG. 1 is a block diagram of an exemplary network interface 10 that accesses the media of an Ethernet (ANSI/IEEE 802.3) network according to an embodiment of the present invention, providing a multiple level rotating priority scheme which assures that particular applications will be provided with a required bandwidth.

The network interface 10, preferably a single-chip, 32-bit Ethernet controller, provides an interface between a local bus 12 of a computer, for example, a peripheral component interconnect (PCI) local bus, and an Ethernet-based media 50. An exemplary network interface is the commercially available Am79C970 PCnet-PCI Single-Chip Ethernet Controller for PCI Local Bus from Advanced Micro Devices, Inc., Sunnyvale, Calif., disclosed on pages 1–868 to 1–1033 of the AMD Ethernet/IEEE 802.3 Family 1994 World Network Data Book/Handbook, the disclosure of which is incorporated in its entirety by reference.

The interface 10 includes a PCI bus interface unit 16, a direct memory access (DMA) buffer management unit 18, and a network interface portion 20 including a media access control (MAC) core 22, an attachment unit interface (AUI) 24, and a twisted-pair transceiver media attachment unit (10BASE-T MAU) 26. The AUI port 24 follows the specification ISO/IEC 8802-3 (IEEE-ANSI 802.3). The interface 10 also includes a microwire EEPROM interface 28, a receive first in first out (FIFO) buffer 30, a transmit FIFO buffer 32, and a FIFO controller 34.

The PCI bus interface unit 16, compliant with the PCI local bus specification (revision 2.1), receives data frames from a host computer's CPU via the PCI bus 12. The PCI bus interface unit 16, under the control of the DMA buffer management unit 18, receives DMA and burst transfers from the CPU via the PCI bus 12. The data frames received from the PCI bus interface unit 16 are passed on a byte-by-byte basis to the transmit FIFO 32.

The buffer management unit 18 manages the reception of the data by the PCI bus interface unit 16 and retrieves information from header bytes that are transmitted at the beginning of transmissions from the CPU via the PCI bus 12. The header information identifying the byte length of the received frame is passed to the FIFO control 34.

The Manchester encoder and attachment unit interface (AUI) 24 includes a Collision In (CI±) differential input pair, operating at pseudo ECL levels, that signals to the network interface 10 when a collision has been detected on the network media. A collision occurs when the CI inputs are driven with a 10 MHz pattern of sufficient amplitude and pulse width that meets the ISO/IEC 8802-3 (ANSI/IEEE 802.3) standards. The Data Out (DO±) output pair of the AUI 24 transmits Manchester encoded data at pseudo ECL levels onto the network media 50. Similarly, the twisted pair interface 26 includes 10BASE-T port differential receivers (RXD±) and 10BASE-T port differential drivers (TXD±).

The media access control (MAC) 20 performs the CSMA/CD functions in response to signals from the interfaces 24 or 26. For example, carrier sense is detected by the DI and RXD signal paths of the AUI port 24 and MAU 26, respectively. The AUI 24 and the MAU 26 each include a physical layer that senses idle to non-idle transitions on the media 50, as specified in Ethernet (ANSI/IEEE 802.3) protocol. The detection of activity on the media 50 is performed by the physical layer, which asserts a valid receive data indication to the MAC 20 layer in response to the detection and decoding of the preamble of a received data packet. Hence, the term activity on the media refers to reception of valid data. The sensed deassertion of the receive carrier occurs when the physical layer determines that the media 50 transitions from a nonidle to an idle state. The AUI 24 detects a collision by the CI inputs, and the MAU 26 detects a collision by sensing activity on both twisted pair signals RXD and TXD.

Figure 2:
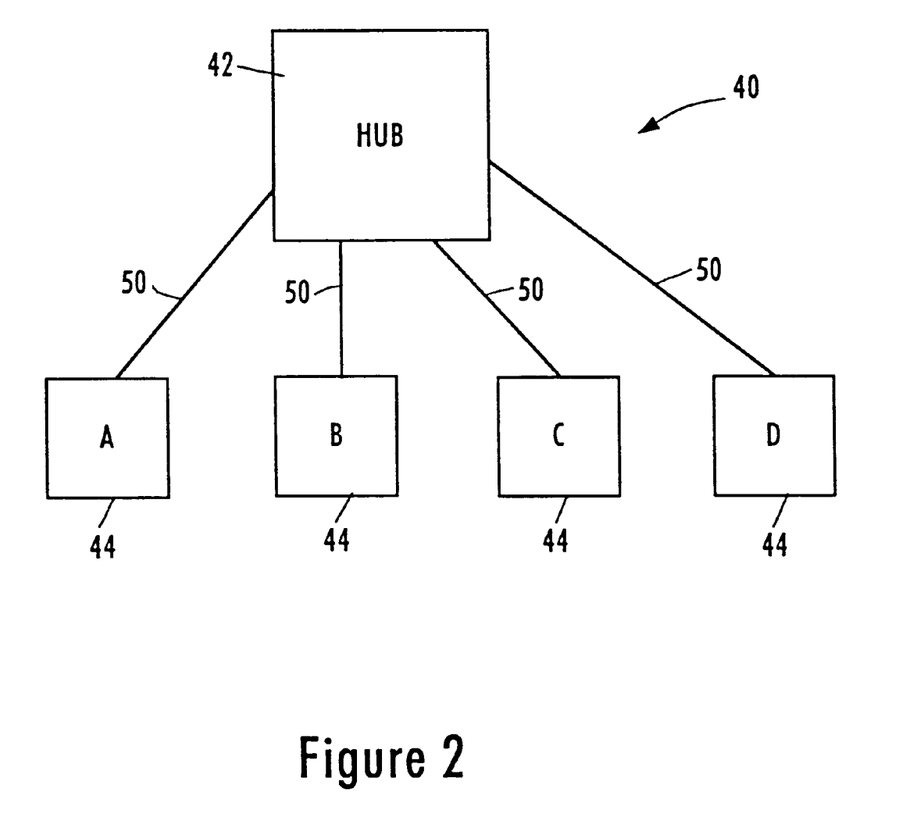
FIG. 2 is a diagram illustrating a layout of an Ethernet network.

FIG. 2 is a diagram illustrating a network 40 having a hub 42 connecting four network stations 44 by the media 50. The media 50 may be either coaxial, fiber optic, or twisted pair wire, and hence may couple the interface 10 to 10BASE-T, 10BASE-2, 100BASE-TX, 100BASE-T4, or 100BASE-FX networks. The network 40 may operate at 10 megabits per second (10 Mbit/s), 100 megabits per second (100 Mbit/s), or 1000 megabits per second (1000 Mbit/s).

The disclosed embodiments provide a multi-level rotating priority scheme to improve performance efficiency by stations in Ethernet networks and ensure that certain applications will be provided with required bandwidth. The delay times in Ethernet network devices are modified by adding integer multiples of predetermined delay intervals to the predetermined interpacket gap interval (IPG) and waiting the modified delay time before attempting access of the media. As described below, once the rotating priority scheme is established for the different priority levels, only one station will have a minimal delay time equal to the predetermined interpacket interval. Hence, only one station will have access to the media at a given time, resulting in an arrangement that avoids collisions and entirely eliminates the capture effect. The rotating priority scheme also provides bounded access latencies, enabling applications requiring bounded access latencies to be used in half-duplex shared networks. Examples of applications requiring bounded access latencies include multimedia applications transporting video and audio data in real time or near-real time.

Methods for encoding the priority of a data packet in its preamble are known. The hub 42, in the event of a collision, examines the preambles of the colliding data packets and issues a jam signal unique to the type of collision. This may be done simply in the hub 42 by examining a single bit in the preamble that encodes a high or low priority for the data packet. For example, a 0 bit in the preamble of the data packet will indicate that one of the colliding data packets is a high priority packet, and a 1 bit in the preamble of another data packet would indicate that the other one of the colliding packets is a low priority packet. The hub 42 will then issue to all of the stations 44 a jam signal that identifies the type of collision. In a two-level priority scheme, as provided in the exemplary embodiment, there are three possible types of collision: high-high, low-low, and high-low. The stations 44 will receive the jam signal and react appropriately to resolve the collision in a conventional manner and then update their priority status according to the present invention, as will be described later.

Figure 3A:
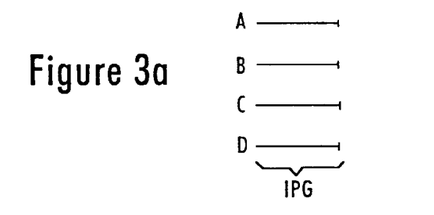
FIGS. 3a, 3b, 3c, 3d and 3e are diagrams illustrating the operation of programmable timers in respective stations of the network.
Figure 3B:
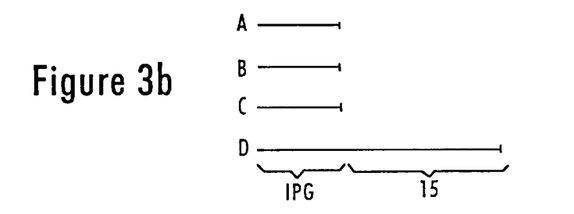
Figure 3C:
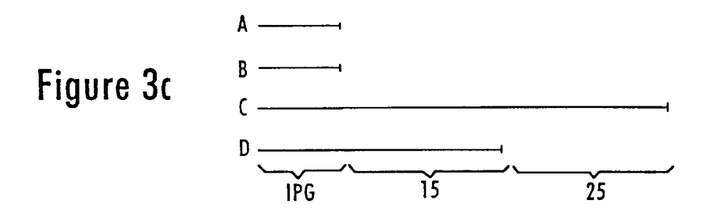
Figure 3D:
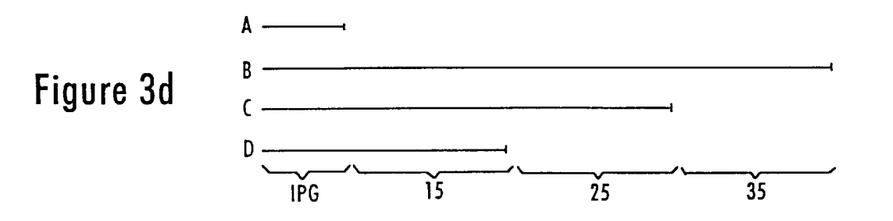
Figure 3E:
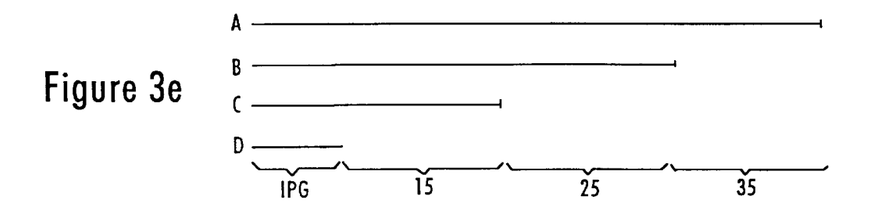

FIGS. 3a–3e schematically depict the timing intervals that the stations 44 will wait after sensing the deassertion of the carrier before attempting transmission of a data packet. FIG. 3a depicts the timing intervals upon initialization, FIGS. 3b–3d are intermediate states, and FIG. 3e depicts exemplary timing intervals after the round robin priority has been established among the stations 44. For the purposes of illustration, a set of timing intervals for only one data priority level has been depicted in FIGS. 3a–3e, although the present invention provides multiple levels of priority, as will be explained.

In the following description, it is assumed that there are four stations 44 on the network 40, and these stations 44 are designated A, B, C, and D. Upon initialization, or re-setting, all of the stations A–D have to wait the same amount of time after the deassertion of the carrier before attempting transmission. This is illustrated in FIG. 3a, in which stations A–D each has a wait time equal to the interpacket gap (IPG) interval. In certain embodiments of the invention, this IPG interval is 96 bits.

Since each of the stations A–D initially waits the same amount of time before transmitting, collisions will occur if two or more of the stations have data to transmit. Collision resolution is performed in a conventional fashion (this assumes that all of the stations in this example are sending data packets having the same data priority level). One of the stations, e.g. D, will win the arbitration procedure and transmit its data. Following the transmission, D's priority will be reduced relative to the other stations A–C. This is accomplished by increasing the wait time for D, i.e., the amount of time D must wait after sensing the deassertion of the carrier. As depicted in FIG. 3b, D's wait time has been increased relative to the remaining stations after D has successfully won the arbitration. The wait time has been increased by one slot time (1s). In certain embodiments of the present invention, in 10 or 100 Mbps Ethernet networks, one slot time is equal to 512 bits. In a 1000 Mbps network, one slot time is equal to 512 bytes, or 4096 bits. As D's wait time is now 608 bits and the other stations' wait times remain 96 bits, D will not be able to access the medium unless none of the other stations A–C have a packet to send since stations A–C will be able to access the medium first.

Assume that after the state reached in FIG. 3b, station C wins the next arbitration among stations A–C, which all have data packets of equal data priority level to send. Once C wins the arbitration and sends its data packet, station C will have its wait time increased, but the increase is by two slot times., as reflected in FIG. 3c. D's wait time remains at the IPG plus one slot time. After the state depicted in FIG. 3c, stations A and B both have data packets to send, and station B wins the arbitration. Station B has its wait time increased by three slot times, and the wait times for C and D remain the same as before. This leaves the state as depicted in FIG. 3d, with a station priority established for the four stations A–D.

The established priority for the stations A–D will continue to rotate. For example, after the priority has been established, as in FIG. 3d, assume that station A (which currently has the highest priority and therefore the shortest wait time) has a data packet to send. After transmission, the wait times for the individual stations A–D are changed to leave the state depicted in FIG. 3e. The wait time for station A has increased by three slot times, the wait time for station B has been decreased to two slot times, the wait time for station C has decreased to one slot time, and the wait time for station D has decreased to zero slot times. The priority has therefore been rotated so that D has the highest priority (and shortest wait time) and A, the most recently transmitting station, has the lowest priority (and longest wait time).

The rotating priority scheme described above assumed that there is only one level of data priority. However, the present invention provides for multi-level data priority. One or more additional levels of priority are achieved in the present invention by causing a station that desires to transmit a low priority data packet to wait for a period of time longer than the longest higher priority wait time. E or example, if a two-level data priority scheme is provided and there are four stations as in the example of FIGS. 3a–3e, the longest wait time for the high priority traffic will be the IPG plus three slot times, as depicted. The shortest wait time for low priority traffic, when there is high priority traffic from four sources in the system, will therefore be the IPG plus four slot times in this example. The wait times are dynamic, however, so that when there is no high priority traffic on the system, the wait times for the low priority traffic reduce to that of the high priority traffic. This avoids a reduction in efficiency for the multi-level data priority scheme.

The amounts of time that an individual station needs to wait before transmitting high priority data and low priority data are kept track of in a lookup table, for example, in or connected to the MAC 22. One or more timers or counters are used that let the MAC 22 know when the wait time for that station for that priority level of traffic has expired since the deassertion of the receive carrier. A lookup table 29 and a timer 31 are depicted schematically in FIG. 1. This is exemplary only, however, as other embodiments of the present invention employ different means of keeping track of the priority and timing.

The establishment and operation of the multi-level rotating priority scheme of the present invention is described below with the aid of three tables depicting examples of operation, and flow charts of an exemplary embodiment of the operation of the scheme in FIGS. 4–8. In the present invention, a station 44 accesses the medium 50 by employing the regular Ethernet protocol, but effectively only one station will access the medium at any given time once priority has been established. This is achieved by dynamic modulation of the wait time as described briefly above and more fully below.

The following notation will be used in the description of the present invention. $N_H$ is the maximum wait time for high priority traffic, $n_L$ is the wait time for a high priority frame for the current station; $N_L$ is the maximum wait time for low priority traffic; and $n_L$ is the wait time for a low priority frame for the current station. "Current station" is the station that is currently transmitting. Increments and decrements of the wait time are in units of slot time. Thus, incrementing by 1 the wait time of a station that currently only waits the IPG time increases the wait time for that station to the IPG time plus one slot time. In the tables, therefore, an indication of zero (0) means that the wait time is currently the IPG time.

The method according to the present invention operates under rules to modify the wait times for high and low priority traffic depending on the type of collision and the priority of the packet transmitted. The outcome of these rules is such that stations with high priority traffic transmit in a round robin fashion followed by low priority traffic. All high priority traffic currently in the network is serviced first, then low priority traffic is transmitted.

The first type of collision described is a "high-high" collision in which two or more high priority frames are involved in the collision. As stated earlier, the hub 42 recognizes this type of collision and generates a unique jam signal so that all of the stations 44 on the network 40 will recognize the collision as a high-high collision. Following a high-high collision, a high priority transmit by one of the stations 44 will occur after collision resolution. The wait times for the stations 44 on the network 40 are then modified as follows:

1. Increment $N_H$ in all stations by 1
2. Set $n_H$ of the current station to $N_H$
3. Update $n_L$ for all of the stations $n_L=N_H+1$ The second type of collision is a "low-low" collision in which two or more low priority frames collide. Again, the hub 42 recognizes this type of collision and issues a jam signal to all of the stations 44 identifying the collision type. This jam signal also indicates that there are no pending high priority transmits. The wait times for the low priority traffic for the stations 44 arc updated as follows:

1. Increment $N_L$ in all stations by 1
2. For the current station, if $n_L=0$, $$\{$$
$$\text{if } N_H = 0$$
$$n_L = N_L$$
$$\text{else}$$
$$n_L = n_L - N_H$$
$$\}$$
$$\text{For other stations, if } N_H \neq 0$$
$$\{$$
$$n_L = n_L - N_H - 1$$
$$\}$$

3. If $n_L=0$, for the current station, $$n_L=n_L-1$$

4. Reset $N_H$, $n_H$, to 0 for all stations

The third type of collision is a "high-low" collision which occurs when a high priority data frame collides with a low priority data frame. The backoff time of the high priority frame is forced to zero slots, so that it will be transmitted before the low priority frame. The low priority frame will follow the conventional TBEB algorithm for backoff. The wait times for the current station are then modified as follows:

1. Low priority traffic for all stations $$n_L=n_L+N_H+1$$

2. If current station $n_H=0$, set $n_H=N_H$ else $n_H=n_H-1$

There also are rules for modifying and updating the wait times of the stations when there are transmissions without collisions. Following a high priority transmit, the wait times are modified as follows:

1. If current station $n_H=0$, set $n_H=N_H$ else $n_H=n_H-1$

Following a low priority transmit without any collision (also indicating no high priority frame to transmit), the wait times for all the stations are updated as follows:

1. If $N_H=0$ for that station, $$\{$$
$$\text{if } n_L = 0$$
$$n_L = N_L$$
$$\text{else}$$
$$n_L = n_L - 1$$
$$\}$$
$$\text{if } N_H \neq 0$$
$$\{$$
$$n_L = n_L - N_H$$
$$\text{Reset } n_H, N_H \text{ for all stations}$$
$$\}$$

When a high priority frame needs to be transmitted following a low priority transmit without collision, the wait times are modified and updated as described for the collision types described above.

Before referring to specific examples of operation, an exemplary embodiment of the method of the present invention for establishing and operating a multi-level rotating priority scheme according to the above-described rules will be described with the flow charts of FIGS. 4–8. Although separated into separate figures for purposes of illustration, these figures represent a single method and are connected as shown by the letters in the figures.

Figure 4:
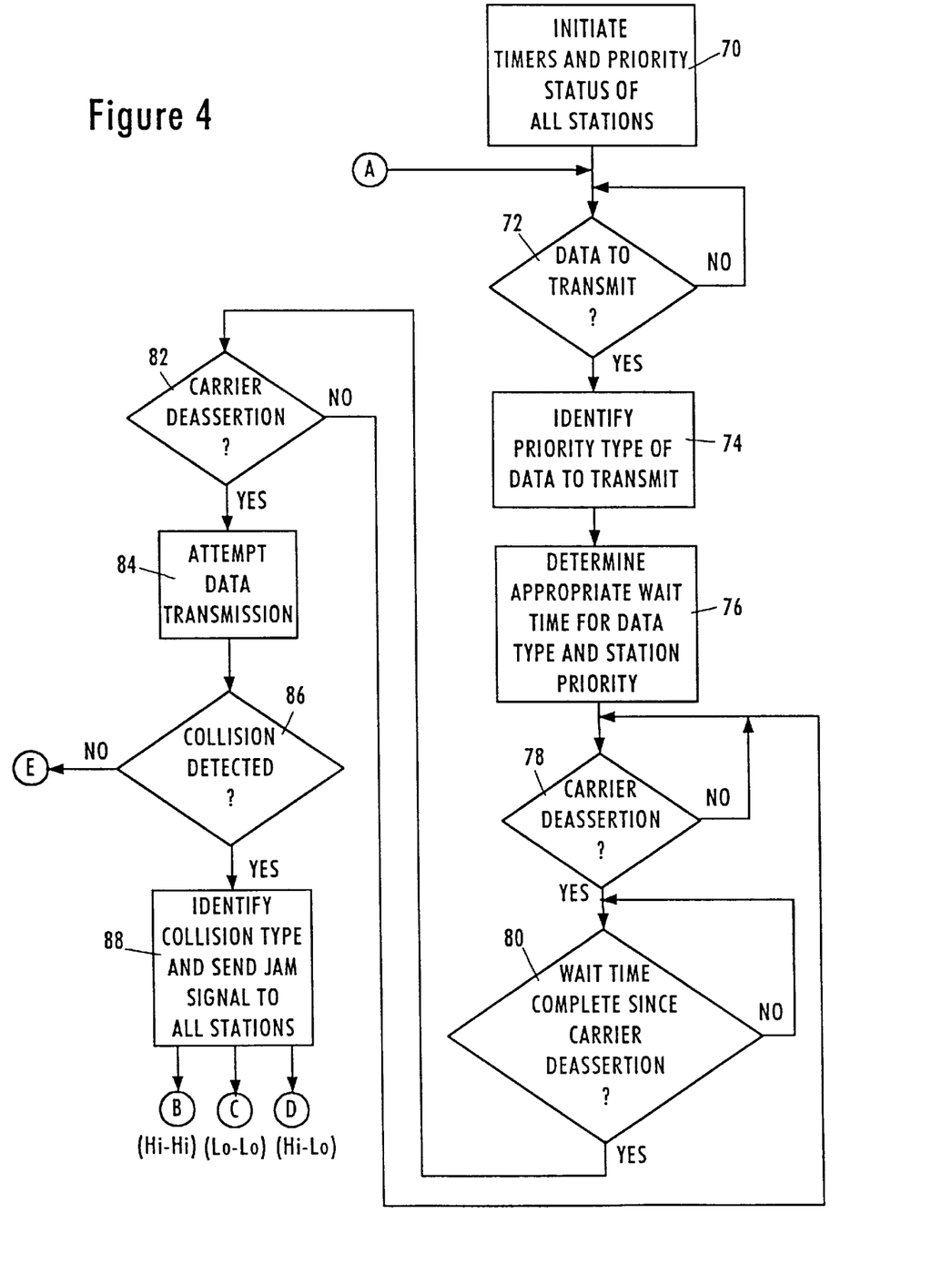

FIG. 4 depicts the main flow of the data transmission scheme of the present invention. In step 70, the timers and priority status of all of the stations 44 on the network 40 are initialized. The priority status is maintained in the look-up tables 29 of the various stations 44. This is different from conventional systems which use a centralized hub to control and keep track of the priority of the stations. In each station 44, it is determined in step 72 whether that station has data to transmit. If not, the station 44 will wait until it has data to transmit.

Assuming that a station 44 has data to transmit, this station 44 will identify the data priority level of the data packet it wants to transmit. In a two-level system, the data priority level will be either high or low. In step 76, the station(s) 44 desiring to transmit will examine its look-up table 29 to determine the appropriate wait time for that data priority level and that station's current priority for that data priority level. Due to the separate round robin queues and the rotating priority of these two queues for the two different priority levels of traffic, a station 44 may not have the same priority for the low priority traffic as it does for the high priority traffic.

Any station 44 that desires to transmit a packet listens for the traffic on the medium 50 and determines whether there has been a deassertion of the receive carrier on the medium 50. If carrier deassertion has not been sensed, the station 44 continues to wait until the carrier is deasserted. Once a station 44 senses that the carrier has been deasserted, its timer 31 is started. In step 80, the stations 44 which have started their timers 31 in response to the carrier deassertion determine whether the wait time that was determined for that station 44 in step 76 is complete since the carrier deassertion was sensed in step 78. Once the wait time has been reached since the carrier deassertion was first sensed, the stations 44 will check again to determine in step 82 whether the carrier is still deasserted. If the carrier is no longer deasserted, as determined in step 82, this means that a station with a higher priority (i.e., a shorter wait time) has already transmitted. In that event, the station 44 returns to monitoring the medium 50 for the carrier deassertion in step 78. Upon initialization, however, all of the stations 44 will have equal priority for all levels of priority traffic until the priority schemes are established following collisions.

Assuming that its wait time has been completed and the carrier is still deasserted, a station 44 will attempt the data transmission in step 84. Each station 44, as well as a repeater or hub 42, will detect any collisions in step 86. If no collisions are detected, the method of the present invention proceeds as indicated in FIG. 8, discussed later. When collisions are detected, the hub 42 will identify the collision type in step 88 and send a unique jam signal that identifies the collision type to all of the stations 44. The three collision types in a two level system are high-high, low-low, and high-low.

Figure 5:
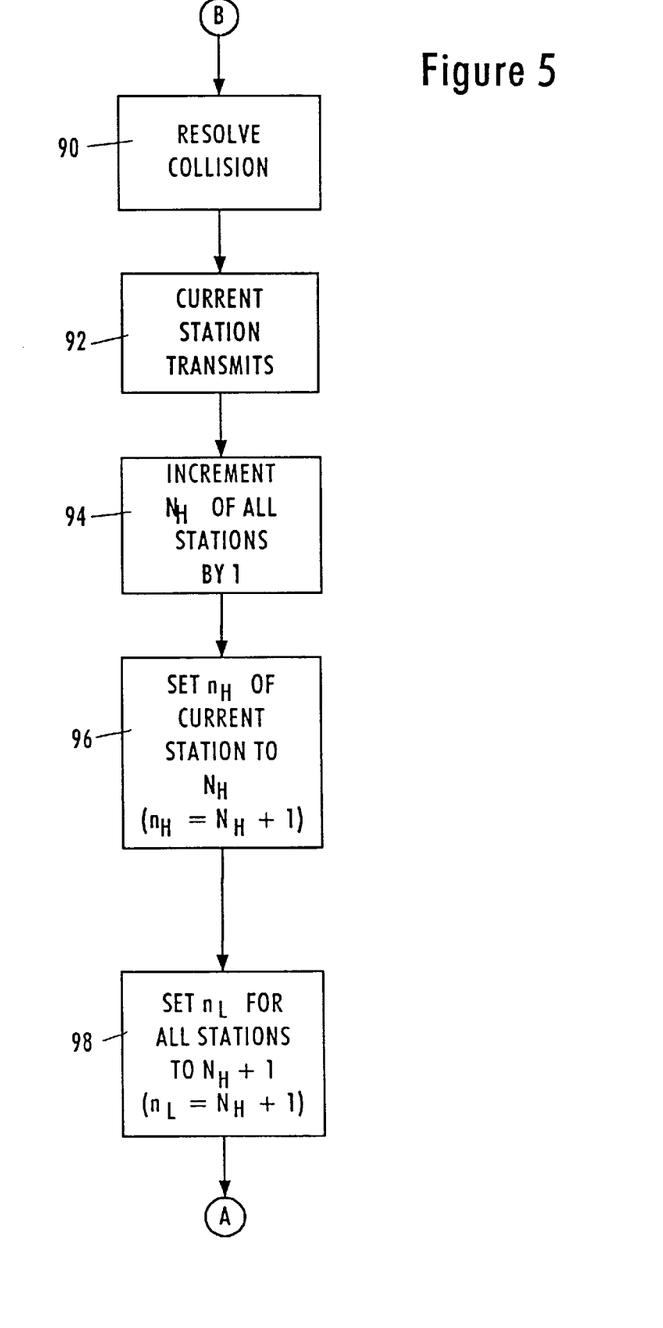

Referring now to FIG. 5, an exemplary embodiment according to the present invention of updating the wait times in the stations 44 following a high-high collision is depicted. In step 90, the current collision between two or more high priority frames is resolved in a conventional manner. One of the stations 44 (A–D) will be selected for transmitting its high priority frame. This station becomes the current station and transmits its high priority frame in step 92. Following this transmission, each of the stations 44 (A–D) will increment its maximum high priority wait time $N_H$ by 1. This has the effect of increasing by one slot time the maximum wait time for high priority traffic of each of the stations 44. The wait time for a high priority frame of the current station is then set to equal the maximum wait time for high priority traffic, so that $n_H=N_H$, as performed in step 96. This effectively changes the priority of the current transmitting station to the lowest priority of the stations in the high priority data round robin queue.

Since high priority traffic is present on the network 40, the wait time for low priority traffic is set to exceed the maximum wait time for high priority traffic in step 98. This is accomplished by setting $n_L$ for all stations to $N_1$ plus 1. As indicated by letter A, the method returns to step 72 in FIG. 4 for the next data transmission.

Figure 6:
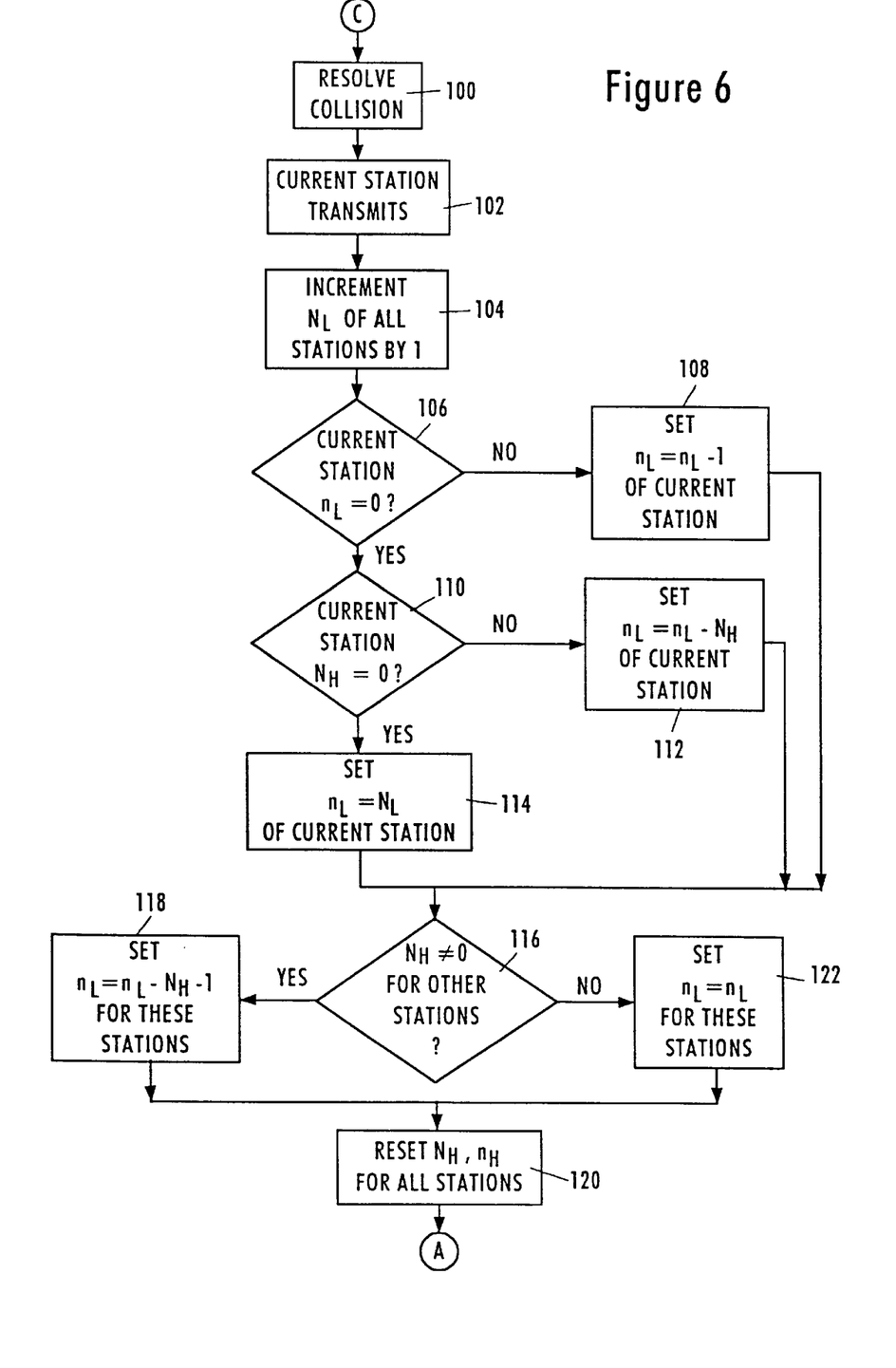

FIG. 6 is an embodiment of the method according to the present invention for updating the wait times for the stations after a "low-low" collision, as identified by the hub 42 which sends the appropriate jam signal to the stations 44 on the network 40. The low-low jam signal indicates that none of the stations 44 desire to transmit high priority traffic.

After the low-low collision has been detected and the unique jam signal has been issued to all of the stations 44 by the hub 42, the collision between the two low priority frames is resolved in a conventional manner in step 100. The station (A–D) which is granted the right to transmit the low priority frame (i.e., data packet) becomes the current station and transmits the low priority frame in step 102 over the medium 50. The maximum wait time $N_L$ for low priority traffic of all of the stations 44 is then increased by one slot time in step 104.

In step 106, it is determined whether the wait time for a low priority frame for the current station $n_L$ is equal to zero (i.e., the IPG). If $n_L$ does not equal to zero, then $n_H$ of the current station is set so that $n_L=n_L-1$, in step 108. If $n_L$ of the current station is equal to zero, then it is next determined whether $N_H$ of the current station is equal to zero, in step 110. If not, then $n_L$ of the current station is set equal to $n_L-N_H$ in step 112. When the maximum wait time for high priority traffic of the current station is equal to zero ($N_H=0$) as determined in step 110, then the wait time for the low priority frame of the current station is set equal to the maximum wait time for low priority traffic ($n_L=N_L$), in step 114.

Following the setting of the wait time for a low priority frame $n_L$ for the current station in steps 108, 112 or 114, it is next determined in step 116 whether the maximum wait time for high priority traffic $N_H$ is not equal to zero for each of the other stations 44 on the network 40. If $N_H \neq 0$ for a particular station, then the wait time for a low priority frame for these stations is set such that $n_L=n_L-N_H-1$ for that station, as depicted in step 118. On the other hand, if $N_H=0$, as determined in step 116, then the wait time $n_L$ is set equal to $n_L$ for these other stations in step 122.

Following the setting of the wait time $n_L$ in all of the stations 44, and in steps 118, 122, the wait time for high priority frames $n_H$ and the maximum wait times for high priority traffic $N_H$ is reset for all of the stations 44 in step 120. The method then returns to step 72 in FIG. 4 for transmission of the next data frame over the medium 50.

Figure 7:
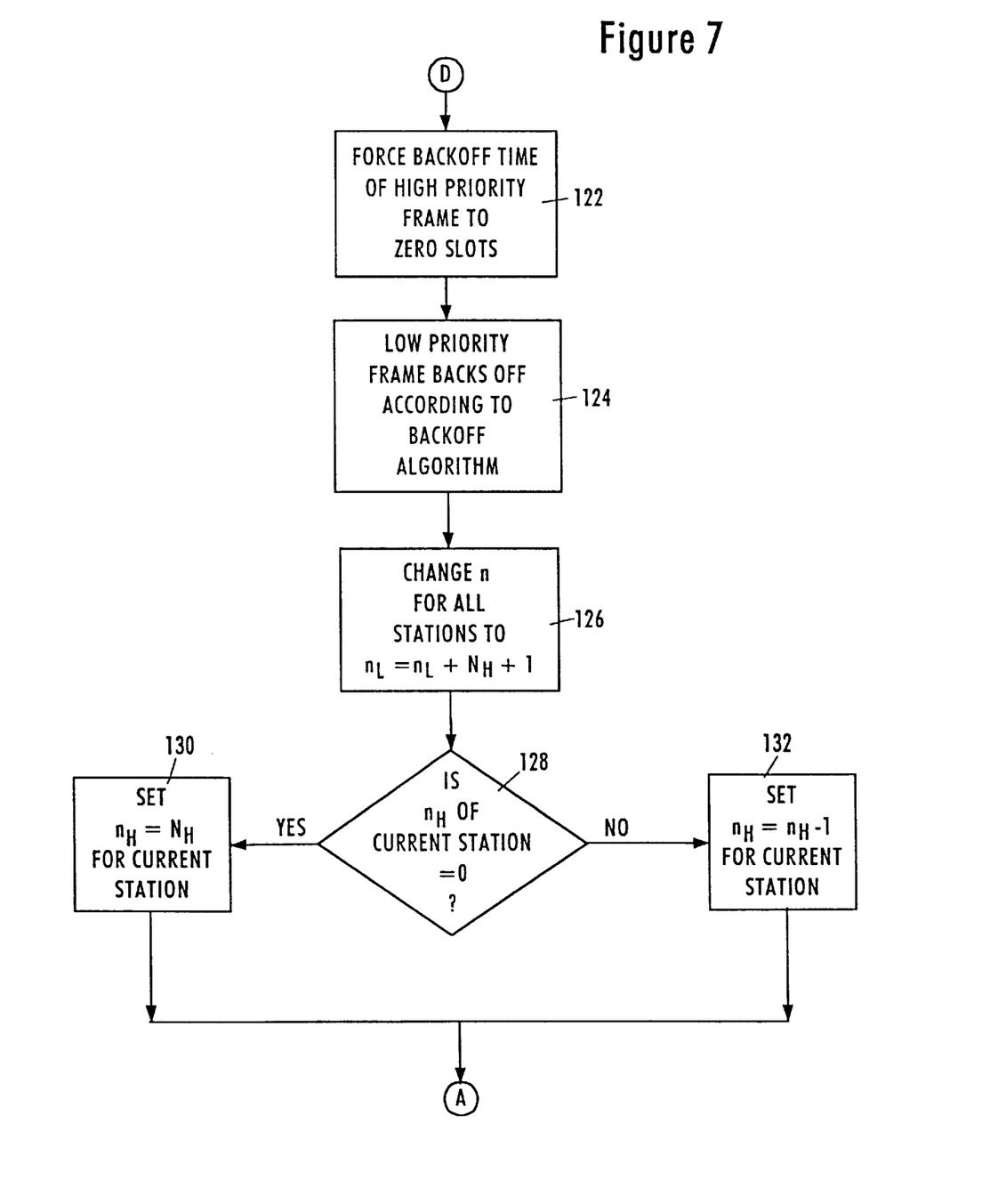

FIG. 7 depicts an exemplary embodiment of a method according to the present invention for updating the wait times of the stations 44 in the event of a "high-low" collision, as identified by the hub 42. In step 123, the backoff time of the high priority frame being transmitted is forced to zero slots. This allows the high priority frame to be transmitted before the low priority frame. Once the backoff time has been forced to zero slots, the high priority frame is transmitted. The low priority frame then will backoff according to a backoff algorithm, such as the TBEB algorithm, in step 124. The wait time for the low priority frame n, is changed for all of the stations 44 to: $n_L=n_L+N_H+1$. This forces the wait time for low priority traffic $n_L$ in all of the stations 44 to be greater than the maximum wait time $N_H$ of any high priority traffic in the stations 44. It is next determined in step 128 whether the wait time for high priority traffic $n_H$ of the current station is equal to zero. If so, then the wait time $n_H$ of the current station is set equal to $N_H$, the maximum wait time for high priority traffic. This is performed in step 130. On the other hand, if the wait time $n_H$ for high priority traffic of the current station is not equal to zero, then it is set equal to $n_H-1$, such that $n_H=n_H-1$, in step 132.

After the wait time for low priority traffic ($n_L$) for all stations has been set in step 126 and the wait time $n_H$ for high priority traffic has been set for the current station in either step 130 or 132, the method returns to step 72 for the next data frame to transmit.

FIG. 8 depicts a method according to an embodiment of the present invention for modifying and updating the wait times for the stations 44 when there are transmissions without collisions (see step 86 of FIG. 4). Once it is determined that no collision has been detected, it is then determined in step 134 whether the transmit is either a high or low priority transmit. Assuming that the transmit is a high priority transmit, it is next determined in step 136 whether the current station that has transmitted the high priority frame has a wait time of $n_H=0$. If so, then the wait time $n_H$ is set equal to $N_H$ for this current station in step 138. Otherwise, the wait time for high priority traffic for this current station is set equal to $N_H-1$ in step 140. The wait times for the low priority frames are not affected and the system returns to step 72 in FIG. 4 for the next transmission of a frame.

If the frame that has been transmitted without collision is a low priority frame, as determined in step 134 it is next determined in step 142 whether the maximum wait time $N_H$ for high priority traffic is equal to zero in each of the stations 44. If $N_H=0$, then at each station 44 it is determined whether the wait time $n_L$ for low priority traffic is equal to zero in step 144. If $n_L=0$, then $n_L$ is set equal to $N_L$ for that station in step 146. If $n_L \ne 0$ for that station, then $n_L$ is set equal to $n_L-1$ for that station, in step 148. If it was determined in step 142 that in a particular station $N_H \ne 0$, then for that station set $n_L = n_L - N_H$ in step 150. Then, in step 152, the wait time $n_H$ for high priority traffic is reset for all stations, as well as the maximum wait time $N_H$ for high priority traffic. Following steps 146, 148 and 152, the method returns to step 72 in FIG. 4 to await the next data frame to transmit.

The method depicted in FIGS. 4–8 according to an exemplary embodiment of the present invention provides a multi-level rotating priority arrangement in which a plurality of round robin queues are established. Examples of operation will be provided below to illustrate how the method is used to establish the high and low priority round robin schemes.

In Table I, depicted below, a four station network A–D is assumed. Each station 44 (A–D) will maintain a look-up table 29 that contains its values of $n_H$, $N_H$, $n_L$, and $N_L$. The look-up table for an individual station does not need to maintain these values for the other stations 44 on the network 40, but only its own values.

In row 0, before a transmit, all of the wait times are initialized to zero. In the example depicted in Table I, it is assumed that all of the stations have high priority frames to transmit. Accordingly, each of the stations A–D will attempt to transmit so that a high-high collision results. It is assumed that the collision resolution results in station A transmitting. The wait times $n_H$ and the maximum wait times $N_H$ are updated as depicted in row 1 following the transmission by station A. Hence, the wait time for station A ($n_H$) has been modified. Even if station A has another high priority frame to transmit, it will not have the opportunity to do so if any of stations B, C or D have high priority frames to transmit, since each of their wait times $n_H$ is equal to zero (the IPG+0 slot time). A's wait time $n_H=1$, and is therefore equal to IPG+1 slot time.

Rows 2 and 3 of Table I depict the updated wait times after two more collisions and transmissions by stations B and C, respectively. Also, at this stage, it should be noted that the wait time $n_L$ for low priority traffic is equal to 4, greater than the maximum wait time $N_H$ of the high priority traffic. This ensures that no low priority frames will be transmitted as long as there are high priority frames to be transmitted. The round robin queue has been established for the high priority frames by row 3, as indicated by the values for the wait time $n_H$ for stations A–D. Following the state in row 3, station D transmits and the wait times nil are updated as indicated in row 4. This illustrates the rotating of the priority in the round robin queue for the high priority traffic. Since the round robin queue has now been established, there are no further collisions between the high priority frames and there is an efficient throughput of the high priority traffic.

The wait times of the high priority traffic are again rotated when station B transmits after row 4, leaving the values depicted in row 5. Row 6, on the other hand, depicts the wait times of low priority traffic when there are no more high priority frames to transmit among the stations A–D. Row 6 also depicts the state after station A has transmitted a low priority frame (assuming that it has a low-low collision or that stations B–D did not have either high or low priority frames to transmit at that time). Rows 7, 8 and 9 show the updated values of the wait times for low priority traffic after further transmissions by stations B, C and D, respectively. By row 8, the round robin queue for the low priority traffic is established among the stations A–D. As can be seen in row 9, the priority is rotated among the stations A–D as the values for $n_L$ change following a transmission by station D.

In the example of Table I, there is no interaction between the high and low priority traffic. In Table II, provided below, another example of operation is shown, but in this example there is interaction between high and low priority traffic.

TABLE I

| Tr No. | A | | | | B | | | | C | | | | D | | | |
|---|---|---|---|---|---|---|---|---|---|---|---|---|---|---|---|---|
| | $n_H$ | $N_H$ | $n_L$ | $N_L$ | $n_H$ | $N_H$ | $n_L$ | $N_L$ | $n_H$ | $N_H$ | $n_L$ | $N_L$ | $n_H$ | $N_H$ | $n_L$ | $N_L$ |
| 0 | 0 | 0 | 0 | 0 | 0 | 0 | 0 | 0 | 0 | 0 | 0 | 0 | 0 | 0 | 0 | 0 |
| 1 | 1 | 1 | 2 | 0 | 0 | 1 | 2 | 0 | 0 | 1 | 2 | 0 | 0 | 1 | 2 | 0 |
| 2 | 1 | 2 | 3 | 0 | 2 | 2 | 3 | 0 | 0 | 2 | 3 | 0 | 0 | 2 | 3 | 0 |
| 3 | 1 | 3 | 4 | 0 | 2 | 3 | 4 | 0 | 3 | 3 | 4 | 0 | 0 | 3 | 4 | 0 |
| 4 | 0 | 3 | 4 | 0 | 1 | 3 | 4 | 0 | 2 | 3 | 4 | 0 | 3 | 3 | 4 | 0 |
| 5 | 3 | 3 | 4 | 0 | 0 | 3 | 4 | 0 | 1 | 3 | 4 | 0 | 2 | 3 | 4 | 0 |
| 6 | 0 | 0 | 1 | 1 | 0 | 0 | 0 | 1 | 0 | 0 | 0 | 1 | 0 | 0 | 0 | 1 |
| 7 | 0 | 0 | 1 | 2 | 0 | 0 | 2 | 2 | 0 | 0 | 0 | 2 | 0 | 0 | 0 | 2 |
| 8 | 0 | 0 | 1 | 3 | 0 | 0 | 2 | 3 | 0 | 0 | 3 | 3 | 0 | 0 | 0 | 3 |
| 9 | 0 | 0 | 0 | 3 | 0 | 0 | 1 | 3 | 0 | 0 | 2 | 3 | 0 | 0 | 3 | 3 |

TABLE II

| Tr | A | | | | B | | | | C | | | | D | | | |
|---|---|---|---|---|---|---|---|---|---|---|---|---|---|---|---|---|
| No. | $n_H$ | $N_H$ | $n_L$ | $N_L$ | $n_H$ | $N_H$ | $n_L$ | $N_L$ | $n_H$ | $N_H$ | $n_L$ | $N_L$ | $n_H$ | $N_H$ | $n_L$ | $N_L$ |
| 0 | 0 | 0 | 0 | 0 | 0 | 0 | 0 | 0 | 0 | 0 | 0 | 0 | 0 | 0 | 0 | 0 |
| 1 | 0 | 0 | 1 | 1 | 0 | 0 | 0 | 1 | 0 | 0 | 0 | 1 | 0 | 0 | 0 | 1 |
| 2 | 0 | 0 | 1 | 2 | 0 | 0 | 2 | 2 | 0 | 0 | 0 | 2 | 0 | 0 | 0 | 2 |
| 3 | 0 | 0 | 1 | 3 | 0 | 0 | 2 | 3 | 0 | 0 | 3 | 3 | 0 | 0 | 0 | 3 |
| 4 | 0 | 0 | 0 | 3 | 0 | 0 | 1 | 3 | 0 | 0 | 2 | 3 | 0 | 0 | 3 | 3 |
| 5 | 0 | 0 | 1 | 3 | 0 | 0 | 2 | 3 | 0 | 0 | 3 | 3 | 0 | 0 | 4 | 3 |
| 6 | 1 | 1 | 2 | 3 | 0 | 1 | 3 | 3 | 0 | 1 | 4 | 3 | 0 | 1 | 5 | 3 |
| 7 | 1 | 2 | 3 | 3 | 0 | 2 | 4 | 3 | 2 | 2 | 5 | 3 | 0 | 2 | 6 | 3 |
| 8 | 1 | 3 | 4 | 3 | 0 | 3 | 5 | 3 | 2 | 3 | 6 | 3 | 3 | 3 | 7 | 3 |
| . | | | | | | | | | | | | | | | | |
| n | | | 1 | 3 | | | 2 | 3 | | | 3 | 3 | | | 4 | 3 |
| n+1 | | | 0 | 3 | | | 1 | 3 | | | 2 | 3 | | | 3 | 3 |
| n+2 | | | 3 | 3 | | | 0 | 3 | | | 1 | 3 | | | 2 | 3 |

After initialization of the wait times for the stations A–D (row 0), it is assumed that all of the stations A–D have low priority frames to transmit. A low-low collision results, followed by the transmission of a low priority frame by station A. This results in the values for the wait times shown in row 1. Rows 2 and 3 depict the values after two more collisions and transmissions. The values for the wait time for high priority traffic remains 0 at this time. After row 4, station B has a high priority transmit. Row 5 depicts the updated wait times for the stations A–D. Note that the low priority wait times $n_L$ have increased for all of the stations A–D. However, since there have been no collisions among the high priority traffic, and only between high and low priority traffic, none of the high priority traffic wait times have been changed yet.

Row 6 depicts the wait times after station A has transmitted a high priority frame, following a collision with high priority frames from stations C and D. Similarly, rows 7 and 8 depict the effects on the wait times after transmissions of high priority frames by stations C and D. The values of the wait times for the stations A–D in row 8 illustrate the two round robin queues that have been established at this time. For example, the high priority wait time $n_H$ for stations A, B, C and D have values 1, 0, 2 and 3, respectively. The station B therefore has the shortest wait time and the highest priority for high priority traffic at row 8. For low priority traffic, the low priority wait times $n_L$ for stations A, B, C and D are 4, 5, 6 and 7, respectively. At row 8, therefore, station A has the shortest wait time and the highest priority for low priority traffic.

Rows n, n+1, and n+2 depict the effects of low priority transmits when there is no high priority data to transmit. As can be seen, the wait times for the low priority traffic $n_L$ are reduced so that the shortest wait time will be equal to the IPG plus zero slot times. This dynamic modulation of the low priority wait time prevents the wait times for low priority traffic from being artificially kept high in order to accommodate the occasional high priority traffic.

It is contemplated to use the present invention in situations in which one particular station in the network will have most of the high priority traffic to transmit. The example of operation depicted in Table III, below, reflects such a situation.

TABLE III

| Tr | A | | | | B | | | | C | | | | D | | | |
|---|---|---|---|---|---|---|---|---|---|---|---|---|---|---|---|---|
| No. | $n_H$ | $N_H$ | $n_L$ | $N_L$ | $n_H$ | $N_H$ | $n_L$ | $N_L$ | $n_H$ | $N_H$ | $n_L$ | $N_L$ | $n_H$ | $N_H$ | $n_L$ | $N_L$ |
| 0 | 0 | 0 | | | | | 0 | 0 | | | 0 | 0 | | | 0 | 0 |
| 1 | 0 | 0 | | | | | 1 | 0 | | | 1 | 0 | | | 1 | 0 |
| 2 | 0 | 0 | | | | | 1 | 0 | | | 1 | 0 | | | 1 | 0 |
| 3 | | | | | | | 0 | 1 | | | 1 | 1 | | | 1 | 1 |
| 4 | | | | | | | 1 | 1 | | | 0 | 1 | | | 0 | 1 |
| 5 | | | | | | | 1 | 2 | | | 2 | 2 | | | 0 | 2 |
| 6 | | | 0 | 0 | | | 0 | 2 | | | 1 | 2 | | | 2 | 2 |
| 7 | | | 3 | 3 | | | 0 | 3 | | | 1 | 3 | | | 2 | 3 |
| 8 | | | 2 | 3 | | | 3 | 3 | | | 0 | 3 | | | 1 | 3 |
| 9 | | | 1 | 3 | | | 2 | 3 | | | 3 | 3 | | | 0 | 3 |

In row 0, all of the stations A–D have their initial wait times set to 0 for both low and high priority traffic. However, only station A has a high priority transmit, while stations B–D have low priority transmits. The high priority and low priority wait times for stations A–D are updated as depicted in rows 1 and 2. After row 2, station A has no more high priority traffic to transmit. A collision occurs among the low priority frames between stations B–D, and station B wins the arbitration and transmits its low priority frame. The wait times for the low priority traffic are updated as shown in row 3. This same process occurs in rows 4 and 5 so that a low priority round robin queue has been established after row 5 among the stations B–D. In row 6, station A has a low priority frame to transmit and a collision occurs between the frames transmitted by stations A and B. The round robin queue for the low priority frames rotates as described in the earlier examples.

The present invention provides a multi-level priority scheme in which the priority rotates for access to the medium in an Ethernet network, for example. The priority at each level rotates to provide equal access to the medium for the stations attached to the network. At the same time, however, the dynamic modulation of the wait times for access to the medium in each of the priority levels supports applications requiring immediate transmission priority, such as real-time delivery. This scheme is accomplished in a decentralized manner, without arbitration and maintenance of the priority by a control hub.

Although the invention has been described in the context of an Ethernet network, it will be understood by those of ordinary skill in the art that the methods are applicable to any type of data communications network.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. In network stations coupled to media of a network, a method of accessing the media, comprising:

determining a priority level of a data packet to be transmitted;

determining non-activity on the media;

determining a wait time following the determination of non-activity on the media to transmit the data packet, the wait time being a function of the priority level of the data packet to be transmitted and a current priority of the network station among the network stations on the network for that data priority level; and transmitting the data packet on the medium after the determined wait time following the determination of non-activity on the media, if there is currently no activity on the media;

further comprising the step of the network stations adjusting their wait times in response to collision identification signals that identify the levels of priority of data packets that collided on the media.

2. The method of claim 1, wherein the step of adjusting includes changing the wait times of the network stations such that a shortest wait time among the network stations for a lower priority level data packet is longer than a longest wait time among the network stations for a higher priority level data packet.

3. The method of claim 2, wherein the step of adjusting includes varying the wait times of the network stations relative to one another such that each network station has a different wait time from the other network stations for each priority level of the data packets to establish different current priorities for each network station relative to the other network stations for each priority level of data packets.

4. The method of claim 3, wherein the step of adjusting includes changing the wait times following a successful transmission of a data packet to rotate the current priorities among the network stations for the priority level of the data packet that was successfully transmitted.

5. The method of claim 4, wherein the wait time is equal to a base time plus an integer multiple of a predetermined time period.

6. The method of claim 5, wherein the base time is an interpacket gap interval and the predetermined time period is a slot time.

7. In network stations coupled to media of a network, a method of accessing the media, comprising:

determining a priority level of a data packet to be transmitted;

determining non-activity on the media;

determining a wait time following the determination of non-activity on the media to transmit the data packet, the wait time being a function of the priority level of the data packet to be transmitted and a current priority of the network station among the network stations on the network for that data priority level; and transmitting the data packet on the medium after the determined wait time following the determination of non-activity on the media, if there is currently no activity on the media;

wherein the priority levels of data packets include a low priority level and a high priority level, and further comprising the step of generating collision identification signals, said collision identification signals including a signal indicating a collision between a plurality of high priority level data packets, a signal indicating a collision between a plurality of low priority level data packets, and a signal indicating a collision between a high priority level data packet and a low level priority data packet.

8. A method of controlling access by network stations to a medium of a network, comprising the steps of:

initializing a current priority for each network station, for a corresponding data packet to be transmitted by that network station from a selected one of multiple priority levels of data packets, each network station, maintaining its current priority for each corresponding data packet;

each network station attempting access to the medium upon expiration of a period of time following the medium becoming available for transmission, if the medium is still available at the expiration of the period of time, the period of time for that network station being dependent on the current priority for that network station for a priority level of the corresponding data packet to be transmitted by that network station; and updating each period of time in each network station on the network after transmission of a data packet by one of the network stations, to thereby update the current priority in each network station from the multiple priority levels of data packets.

9. The method of claim 8, wherein the step of updating includes changing the periods of time in the network stations so as to rotate the current priority in the network stations for at least the priority level of the data packet that was transmitted.

10. The method of claim 9, wherein the step of updating includes adjusting the periods of time in response to collision identification signals that identify the priority levels of the data packets that collided on the medium.

11. The method of claim 10, wherein the step of adjusting includes changing the periods of time in the network stations such that a shortest period of time among the network stations for a lower priority level data packet is longer than a longest period of time among the network stations for a higher priority level data packet.

12. The method of claim 11, wherein the step of changing the periods of time includes varying the periods of time of the network stations relative to one another such that each network station has a different period of time from the other network stations for each priority level of the data packets to establish different current priorities for each network station relative to the other network stations for each priority level of data packets.

13. The method of claim 12, wherein each period of time is equal to a base time plus an integer multiple of a predetermined length of time.

14. The method of claim 13, wherein the base time is an interpacket gap interval and the predetermined length of time is a slot time.

15. The method of claim 8, wherein the priority levels of the data packets include a low priority level and a high priority level, and further comprising the step of generating the collision identification signals, said collision identification signals including a signal indicating a collision between a plurality of high priority level data packets, a signal indicating a collision between a plurality of low priority level data packets, and a signal indicating a collision between a high priority level data packet and a low level priority data packet.

16. A network interface for connection with media of a network, comprising:

- a carrier sensor sensing deassertion of a carrier on the media;
- a programmable timer counting a wait time in response to the sensed deassertion of said carrier, the wait time including an interpacket gap interval and an integer multiple of a slot time;
- a memory that stores a plurality of the wait times for the network interface, with a separate wait time provided for each data priority level;
- a controller that programs the timer to count the wait time stored in the memory for the data priority level of a data packet to be transmitted by the network interface; and
- a transmitter outputting the data packet onto the media in response to a determined absence of activity by said sensor during the wait time.

17. The network interface of claim 16, wherein the controller is responsive to collision identification signals that identify data priority levels of data packets that collide on the media to change the wait times stored in the memory.

18. The network interface of claim 17, wherein the controller includes means for incrementing or decrementing the wait times stored in the memory by an integer multiple of the slot time.

* * * * *

UNITED STATES PATENT AND TRADEMARK OFFICE
CERTIFICATE OF CORRECTION

PATENT NO. : 5,963,560
DATED : Oct. 5, 1999
INVENTOR(S) : Kalkunte

It is certified that error appears in the above-identified patent and that said Letters Patent is hereby corrected as shown below:

In the Claims, in the Claim 8, line 5, before "from" insert comma (,) and in line 6, before "maintaining" delete the comma (,).

Signed and Sealed this

Twenty-third Day of May, 2000

*Attest:*

Q. TODD DICKINSON

*Attesting Officer*    *Director of Patents and Trademarks*